United States Patent
Bank et al.

(10) Patent No.: US 6,312,579 B1
(45) Date of Patent: Nov. 6, 2001

(54) BEARING HAVING MULTILAYER OVERLAY AND METHOD OF MANUFACTURE

(75) Inventors: Brian L. Bank, Hartland; James R. Toth, Ann Arbor, both of MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 0 days.

(21) Appl. No.: 09/433,689

(22) Filed: Nov. 4, 1999

(51) Int. Cl.[7] .............................. C25D 5/16; C25D 5/18; C25D 7/10

(52) U.S. Cl. .................. 205/95; 205/102; 205/104; 205/170; 205/176; 205/300; 205/96

(58) Field of Search ............................ 205/96, 102, 104, 205/170, 176, 241, 252, 300, 301, 302, 303, 304, 95

(56) References Cited

U.S. PATENT DOCUMENTS

| | | |
|---|---|---|
| 3,077,285 | 2/1963 | Budininkas . |
| 3,215,513 | 11/1965 | Schaefer . |
| 3,522,974 | 8/1970 | Polti . |
| 3,623,205 | 11/1971 | Scott . |
| 4,474,861 | 10/1984 | Ecer . |
| 4,553,856 | 11/1985 | Bierlein . |
| 4,836,695 | 6/1989 | Baureis . |
| 4,889,435 | 12/1989 | Gojon . |
| 4,999,257 | 3/1991 | Imai . |
| 5,056,936 | 10/1991 | Mahrus . |
| 5,056,937 | 10/1991 | Tanaka . |
| 5,156,729 | * 10/1992 | Mahrus et al. ................... 205/104 |
| 5,185,216 | 2/1993 | Tanaka . |
| 5,209,578 | 5/1993 | Eastham . |
| 5,434,012 | 7/1995 | Tanaka . |
| 5,489,487 | 2/1996 | Tanaka . |
| 5,601,371 | 2/1997 | Koroschetz . |
| 5,665,480 | 9/1997 | Tanaka . |

* cited by examiner

Primary Examiner—Robert Dawson
Assistant Examiner—Michael J. Feely
(74) Attorney, Agent, or Firm—Reising, Ethington, Barnes, Kisselle, Learman & McCulloch, P.C.

(57) ABSTRACT

A multilayer engine bearing (10) includes a steel backing (12) having a liner (14) of bearing metal of either copper-lead or aluminum alloys formed on the backing (12). A multilayer overplate (24, 124) is formed on the base lining member (16) and includes at least a first layer (28, 128) electrodeposited from a bath at a first current density to a desired thickness, and at least one additional layer (26, 126) electrodeposited from the same bath but at a different current density and to a desired thickness to yield a composite lamellar overplate structure having layers with differing deposit characteristics, such as hard and soft layers, generated from the same bath at different current densities.

8 Claims, 1 Drawing Sheet

BEARING HAVING MULTILAYER OVERLAY AND METHOD OF MANUFACTURE

BACKGROUND OF THE INVENTION

1. Technical Field

The present invention relates generally to plain bearings and to their method of manufacturing and particularly to multilayer engine bearings of the type having a metal backing on which a functional bearing layer is applied which in turn is plated with an overlay of soft metal.

2. Related Prior Art

Plain engine journal-type bearings for use in high load engine applications for journaling crank shafts and the like typically include a base lining member having a functional bearing layer of either copper-lead or aluminum alloy applied to a steel backing. A single layer of a lead-tin-copper alloy having a thickness of about 25 $\mu$m is typically plated onto the functional layer. Often, a nickel diffision barrier or copper bonding layer is interposed between the overplate and functional layer to prevent the tin from diffusing from the overplate into the bearing layer. As a final step, the bearing is typically coated with a micro-thin layer of tin or lead-tin flash plating having a thickness of about 1 $\mu$m or less. The flash plating is primarily cosmetic, giving the product a bright, pleasing appearance. It also provides a level of corrosion protection to the steel backing. Within a short time during engine break-in, the micro-thin flash plating applied to the running surface of the bearing dissipates.

In service, such multilayer crank shaft bearings are subjected to high dynamic loads that vary in magnitude and direction due to the inertial loads applied by the piston and connecting rod mechanism and by the cylinder gas. The soft overplate layer enables such bearings to conform under high load forces to any misalignments or changes in profile of loading of the member being journaled, so that the loads are distributed across a greater surface area of the bearing. The overplate also allows any foreign particles of dirt or metal that may come between the bearing surface and the member being journaled to become embedded or absorbed into the bearing surface, so as to protect the bearing journal from excessive wear or damage.

It is generally accepted that conformability and embedibility of the overplate are dependent upon overplate thickness, with a thicker overplate being preferred. It is also generally known that as the thickness of the overplate increases, so does the susceptibility to bearing fatigue (i.e., the fracturing of the bearing surface when under load). Resistance to fatigue cracking requires that the bearing surface possess sufficient tensile strength to enable it to undergo minor configuration changes without cracking. Thus, it is necessary to balance the competing properties of conformability and embedibility with fatigue resistance when designing engine bearings, particularly ones that are subjected to high dynamic loading.

For many high load engine applications, it has been found that the 25 $\mu$m thick single layer lead-tin-copper overplate mentioned above provides excellent conformability and embedibility characteristics and good fatigue resistance. However, as the output and efficiency of engines increases, so does the dynamic loading placed on the crank shaft bearings, and thus the increased potential for bearing fatigue. Under extreme loading conditions, the conventional bearings described above employing the single 25 $\mu$m thick overplate of lead-tin-copper are prone to fatigue. Efforts to alleviate fatigue by simply decreasing the thickness of the single layer overplate to less than 25 $\mu$m have been generally unsuccessful, as it is at the cost of sacrificing acceptable levels of conformability and embedibility. Thus, there exists a need in the industry for an improved journal bearing that can perform under such extreme high dynamic loading conditions without experiencing fatigue and while maintaining good conformability and embedibility characteristics.

SUMMARY OF THE INVENTION

According to the invention, a multilayer engine bearing is provided comprising a base lining member having a rigid metal backing and a liner of bearing metal formed on the backing, and is characterized by a multilayer overplate electrodeposited from a single bath onto the base lining member at different current densities to provide at least two overplate layers from the same bath having distinct deposit characteristics.

According to a method of the invention for producing such multilayer bearings, the base lining member is prepared from the rigid backing and bearing metal liner, following which the multilayer overplate is electrodeposited onto the base lining member from a single plating bath by altering the current density to yield at least two distinct layers having different deposit characteristics.

By varying the current density, it is possible according to the invention to produce two or more overplate layers from the same bath having differing hardness, for example. In a two layer overplate system, the outer most layer can be plated at a current density to yield a relatively soft metal layer having good conformability and embedibility characteristics. The layer beneath can be plated at a different current density to yield a relatively harder layer to provide adequate backing support and thus fatigue resistance to the composite overplate.

Another advantage of the invention is that use of a single electroplating bath to produce the multilayer overplate simplifies the manufacture of high performance journal bearings at a recognized cost savings.

Another advantage of the present invention is that such a multilayer overplate having be desired conformability, embedibility and fatigue resistance characteristics can be achieved with lead-free overplate layers, thus avoiding the use of heavy metals which is environmentally advantageous.

BRIEF DESCRIPTION OF THE DRAWINGS

These and other features and advantages of the present invention will become more readily appreciated when considered in connection with the following detailed description and drawings, wherein.

DETAILED DESCRIPTION

Figure 1:
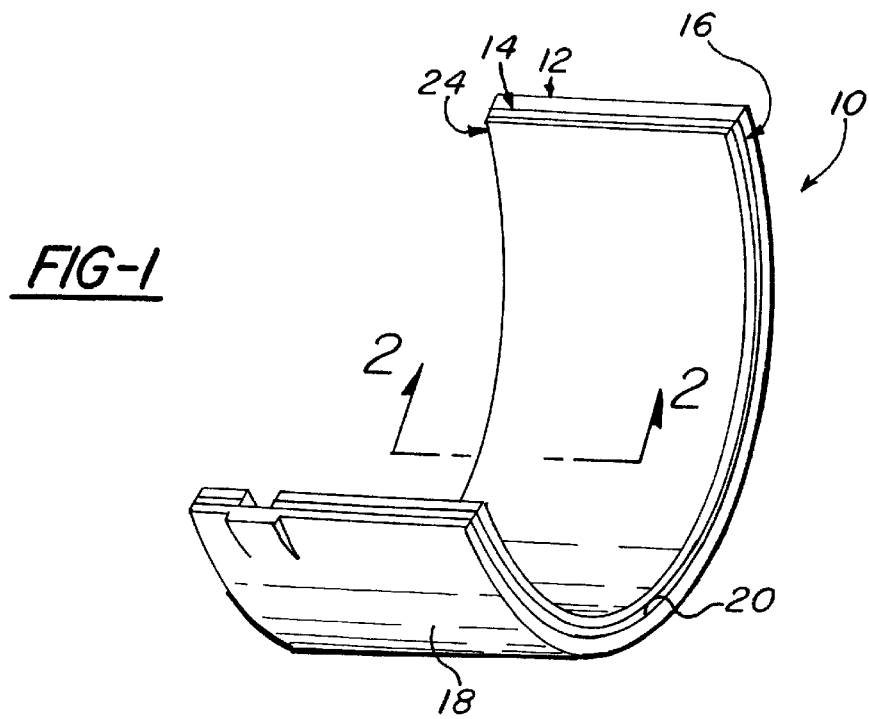
FIG. 1 is a perspective view of a multilayer bearing constructing according to the invention.

A multilayer bearing constructed according to the invention is shown generally at 10 in FIG. 1 and is of the sliding type often referred to as journal bearings or plain bearings which are used in pairs between two relatively rotatable components, such as a connecting rod and crank shaft, to establish a journaled connection therebetween. Such multilayer bearings of the type to which the invention is directed also include multilayer bushings.

Referring to FIG. 1, a bearing 10 constructed according to the invention includes a rigid metal support backing 12 and a liner 14 of metallic bearing material formed on the backing to collectively provide a base lining member 16 which forms the foundation of the bearing 10. The backing 12 preferably comprises an arcuate, semi-circular strip of steel having a convex outer surface 18 adapted for seating in a mating concave support structure, and an opposite concave inner surface 20 on which the bearing liner 14 is applied. The bearing liner 14 may be formed of conventional bearing layer materials, including copper-lead or aluminum alloys of conventional compositions, which may be cast or otherwise formed on the inner surface 20 according to well known practice. The base lining member 16 may also include a thin barrier layer or film 22 (i.e., about 1 to 2 $\mu$m thick) of either nickel or copper which may be electroplated onto the liner 14 according to conventional practice to serve as a migration barrier or as a bonding layer for the overplate to be described below.

The construction described thus far with respect to the base lining member 16 is conventional. Where the invention departs from conventional practice is that following the fabrication of the base lining member 16, a multilayer overplate 24 is formed on the base lining member 16 from multiple layers of overplate material electrodeposited onto the base lining member 16 from the same electroplate bath at different current densities to provide the multiple layers with different deposit characteristics.

Figure 2:
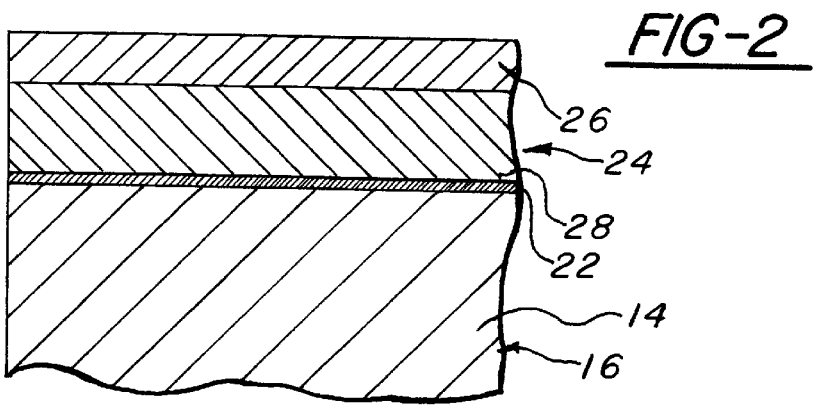
FIG. 2 is an enlarged fragmentary sectional view taken generally along lines 2—2 of FIG. 1.

Referring to FIG. 2, the multilayer overplate 24 comprises at least two layers 26,28 plated from the same bath at different current densities. The outer layer 26 may be plated at a relatively high current density to yield a relatively soft overplate layer having a thickness of about 3 to 7 $\mu$m, and preferably about 5 $\mu$m thick to provide good conformability and embedibility characteristics of the overplate 24. The inner layer 28 may be plated at a relatively lower current density to yield a relatively harder layer 28 than that of the outer layer 26 having a thickness ranging from about 7 to 13 $\mu$m, and preferably about 10 $\mu$m to provide a supportive backing for the outer layer 26 for good fatigue strength characteristics of the overplate 24. It will be understood that the particular two layer example of FIG. 2 is but one of numerous variants that could be employed and are contemplated by the invention. The layers could, for example, be reversed such that the outer layer 26 is harder than the inner layer or the thicknesses varied to meet the needs of a particular application. The common characteristic among all contemplated variants is that the multiple overplate layers are produced from the same electroplate bath and plated at different current densities to yield a composite lamellar structure having two or more layers of differing deposit characteristics, such as hardness.

Figure 3:
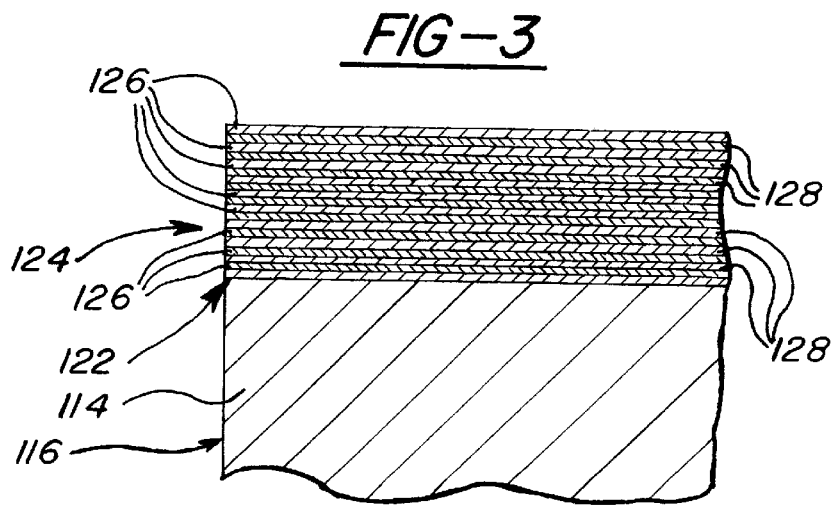
FIG. 3 is a view like FIG. 2 but of an alternative embodiment of the multilayer overplate.

FIG. 3 shows such an alternative embodiment wherein the same reference numerals are used to indicate like features, but are offset by 100. In the FIG. 3 embodiment, the overplate 124 is comprised of three or more layers plated from the same bath at different current densities. In the illustrated example, 15 such layers are shown and may comprise, for example, alternating soft 126 and hard 128 layers like those of the FIG. 2 embodiment, each being very thin in comparison to the overall thickness of the overplate and built up to achieve the desired overplate thickness. For example, the individual alternating layers 26,28 may each be 1 $\mu$m thick and built up to provide an overall overplate thickness of about 15 $\mu$m. The invention contemplates, however, less or greater individual layer of thicknesses and an overall thickness less than 10 or greater than 15, provided the overplate achieves the desired embedibility, conformability and fatigue resistant characteristics required for a given application. The hard layers 128, for example, may be 2 $\mu$m thick, whereas the softer layers 126 may be 1 $\mu$m thick. The reverse is also contemplated. Also contemplated are variants where the layers may be plated at three or more different current densities to yield still added varying deposit characteristics of the layers.

In the above examples, it is preferred that the overplate 24 be fabricated from lead-free overplate materials. While numerous electroplate baths are contemplated, a tin floubo-rate electrolyte plating bath is preferred. The relatively soft layers 26,126 may be plated at a relatively high current density of about 75 ASF (amps/ft$^2$), whereas the relatively harder layers 28,128 may be deposited at a relatively low current density of about 25 ASF. While the 75/25 ASF current density relationship is preferred, it is to be understood that the invention is not limited thereto and other current densities are contemplated so long as the current densities are different for the alternating layers.

Once the overplate is applied, the usual thin flash coat of tin (not shown) may be applied to the bearing 10 for aesthetic purposes, which is quickly worn from the bearing surface during the running in period of the bearing.

According to a method of fabricating a multilayer bearing 10 of the invention, the base lining member 16 is prepared according to conventional practice by bonding the metal bearing liner 14 to the inner surface 20 of the backing 12 and then plating the liner 14 with the barrier layer 22 in preparation to receive the multilayer overplate 24. The overplate 24 is applied by exposing the concave surface of the base lining member 16 to the desired electroplating solution and then electrodepositing multiple layers from the same bath onto the base lining 16 at different current densities to yield multiple layers of differing deposit characteristics.

According to a particular embodiment, a tin floubo-rate electrolyte plating bath is employed and, according to the FIG. 2 embodiment, a 10 $\mu$m thick tin floubo-rate electrolyte plating layer is deposited at 25 ASF (low current density) onto the base lining member 16, after which a five $\mu$m thick tin floubo-rate electrolyte plating layer 26 is deposited at 75 ASF (high current density) onto the layer 28 to yield a relatively soft outer layer 26 and a relatively harder inner layer 28.

According to the FIG. 3 embodiment, the same bath and current densities are employed to yield multiple 1 $\mu$m thick alternating layers of soft 126 and hard 128 tin floubo-rate electrolyte plating material. As mentioned previously, the thicknesses of the layers and current densities can be varied to suit the needs of a particular application.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A method of fabricating a multilayer sliding bearing comprising:

preparing a base lining member having a rigid metal backing and a layer of bearing metal applied to the backing; and electrodepositing from a single plating bath a lead-free multilayer overplate on the base lining member including at least two distinct lead-free layers electrodeposited at different current densities from the same bath to provide the multiple lead-free overplate layers with different deposit characteristics.

2. The method of claim 1 including controlling the current density of the plating bath to provide the multiple layers with different hardnesses.

3. The method of claim 1 including controlling the electrodeposition to form the overplate with a relatively hard under layer having a thickness of about 10 μm thick and an outer layer having a thickness of about 5 μm.

4. The method of claim 1 including selecting an overplate bath of tin flouborate electrolyte solution from which to electrodeposit the multilayer overplate.

5. The method of claim 2 including electrodepositing multiple alternating layers from the bath exceeding three in number each deposited at a different current density than that of an adjacent layer to yield different deposit characteristics of the layers.

6. The method of claim 5 including controlling the electrodeposition to provide the multiple overplate layers with alternating soft and hard deposit characteristics.

7. The method of claim 6 including controlling the electrodeposition to form the thicknesses of the individual layers to about 1 to 2 μm each.

8. The method of claim 7 including controlling the electrodeposition to provide a total overplate thickness of the multiple layers of about 10 to 25 μm.

* * * * *